(12) United States Patent
Kuo

(10) Patent No.: US 6,394,689 B1
(45) Date of Patent: May 28, 2002

(54) PARTITION SCREEN CONNECTING DEVICE

(76) Inventor: Yi-Ching Kuo, P.O. Box 82-144, Taipei (TW)

(*) Notice: Subject to any disclaimer, the term of this patent is extended or adjusted under 35 U.S.C. 154(b) by 0 days.

(21) Appl. No.: 09/472,793

(22) Filed: Dec. 28, 1999

(51) Int. Cl.⁷ .................................................. F16B 5/00
(52) U.S. Cl. ........................ 403/177; 403/305; 403/299
(58) Field of Search ................................ 403/177, 178, 403/169, 305, 301, 300, 299, 296; 411/338, 339, 389, 531, 87; 52/582.1, 698, 740.1

(56) References Cited

U.S. PATENT DOCUMENTS

| | | | | |
|---|---|---|---|---|
| 4,081,219 A | * | 3/1978 | Dykmans | 403/301 X |
| 4,324,036 A | * | 4/1982 | Reilly | 411/389 X |
| 5,533,580 A | * | 7/1996 | Reaves | 411/389 X |
| 6,073,642 A | * | 6/2000 | Huang | 403/305 X |

* cited by examiner

Primary Examiner—Lynne H. Browne
Assistant Examiner—John R. Cottingham
(74) Attorney, Agent, or Firm—A & J

(57) ABSTRACT

An improved partition screen connecting device includes at least an insert head, a coupling tube, and a connecting plate. A fightening element may be provided between the coupling tube and the insert head. In use, the connecting device is insertably disposed in support tubes provided on both sides of a partition screen such that the tightening element can fittingly engage the support tubes so that the connecting device will not easily slip but cannot be readily changed. By virtue of the partition screen connecting device, a plurality of partition screens can be flexibly connected. Both ends of the connecting device are configured to allow stacking of partition screens so that the parititions screens can be connected in a horizontal or vertical manner, and foldable to give variety to their arrangement.

1 Claim, 9 Drawing Sheets

PARTITION SCREEN CONNECTING DEVICE

BACKGROUND OF THE INVENTION (a) Field of the Invention

The present invention relates to an improved partition screen connecting device.

(b) Description of the Prior Art

Partition screens are commonly used in offices or exhibition halls to divide a relative large space into a number of smaller units so the personnel will not be disturbed and can concentrate while working.

With reference to the annexed United States patents, the devices disclosed therein are largely complicated in construction, lacking in variety, and costly to manufacture.

SUMMARY OF THE INVENTION

A primary object of the present invention is to provide an improved partition screen connecting device that can connect a plurality of partition screens by means of insert pins and allow connection of partition screens in a horizontal and vertical manner and in a stacking and sidewise manner to permit variety in arrangement.

Another object of the present invention is to provide an improved partition screen connecting device that is provided on both sides of a partition screen by means of insertion pins, with tightening elements securing the connecting device so that the partition screen assembly is firmly connected. Besides, the connecting device can be replaced and will not easily become disengaged due to external influences.

A further object of the present invention is to provide a convenient, simple and practical partition screen structure by simplifying construction of partition screens and utilizing lightweight material in conjunction with quick-to-assemble connecting devices so as to eliminate the drawbacks of prior partition screens, namely complicated construction, laborious assembly, and difficult re-arrangement.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
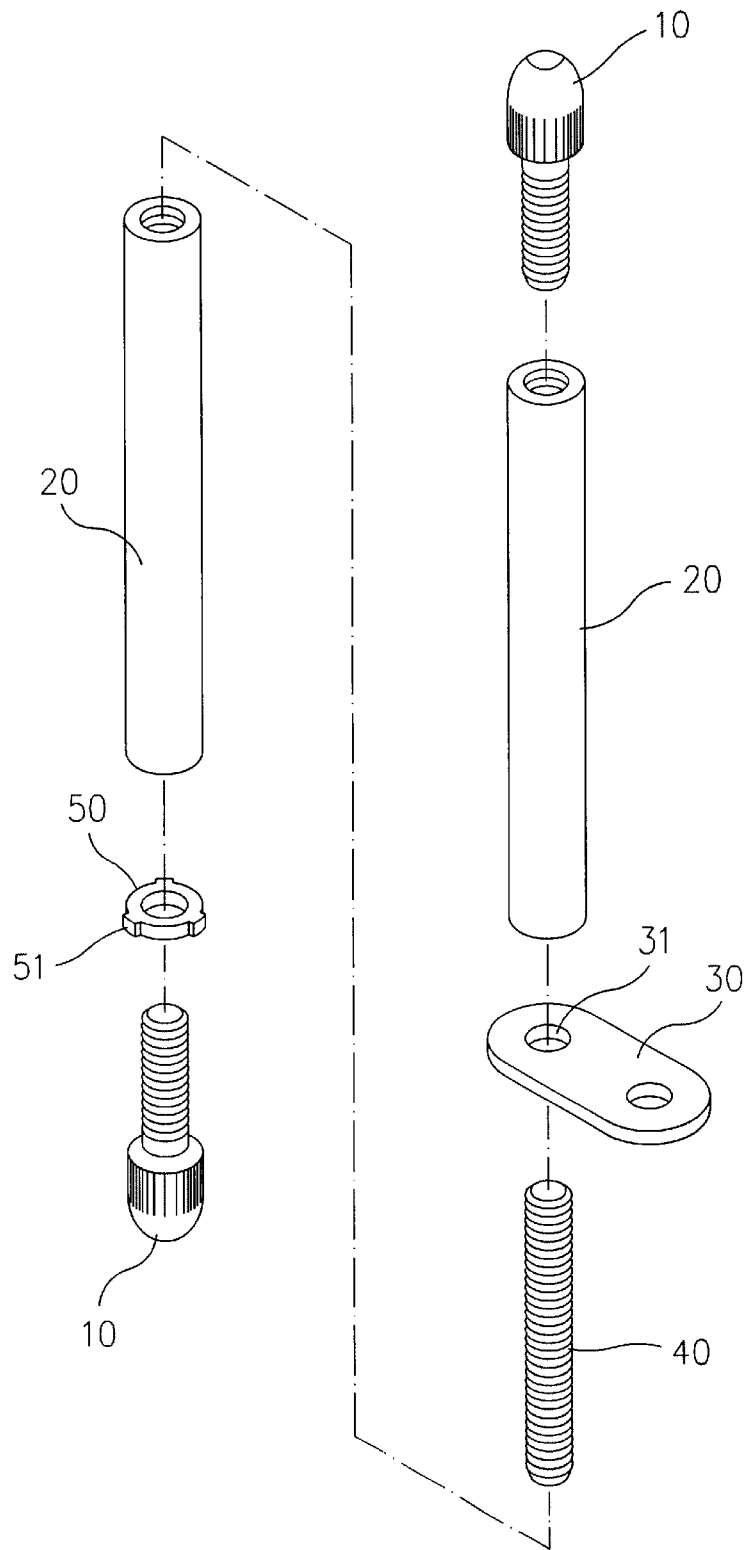
FIG. 1 is a schematic view of a partition screen connecting device (for intermediate connection) of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 5:
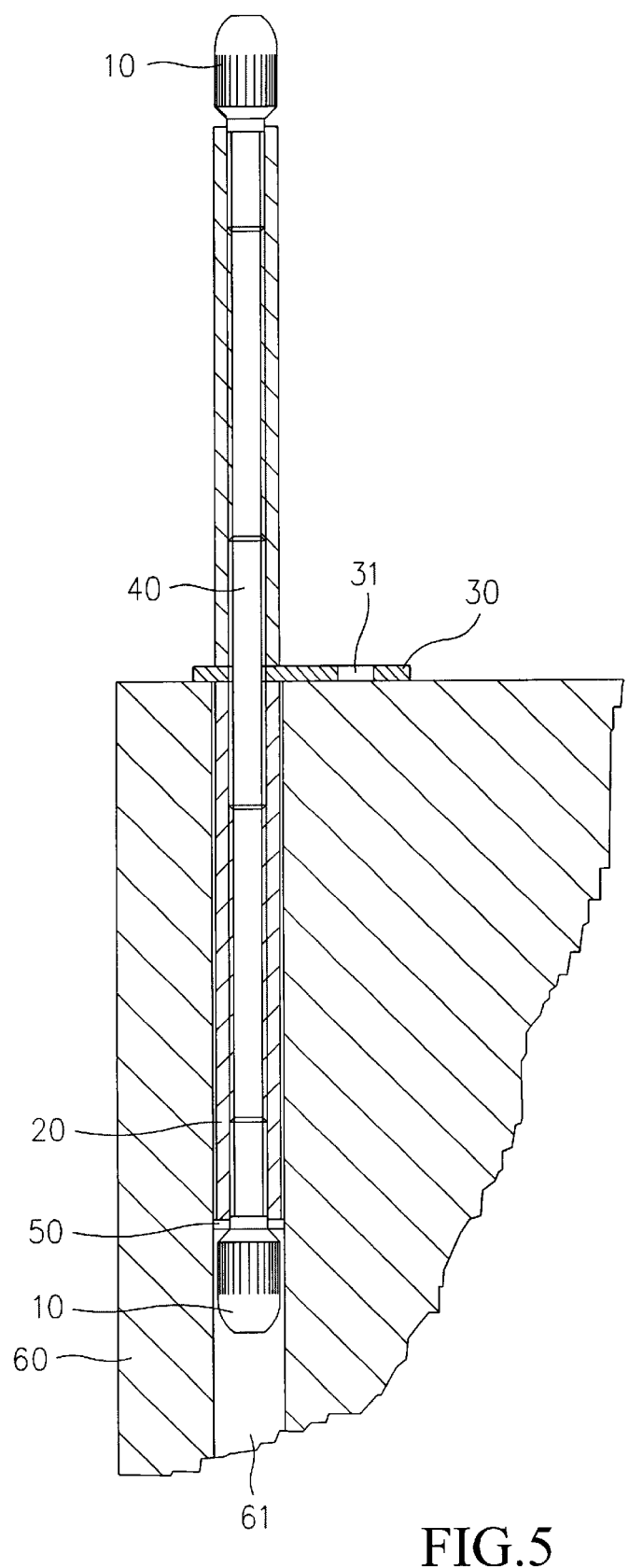
FIG. 5 is an assembled sectional schematic view of the partition screen connecting device of the present invention.
Figure 6:
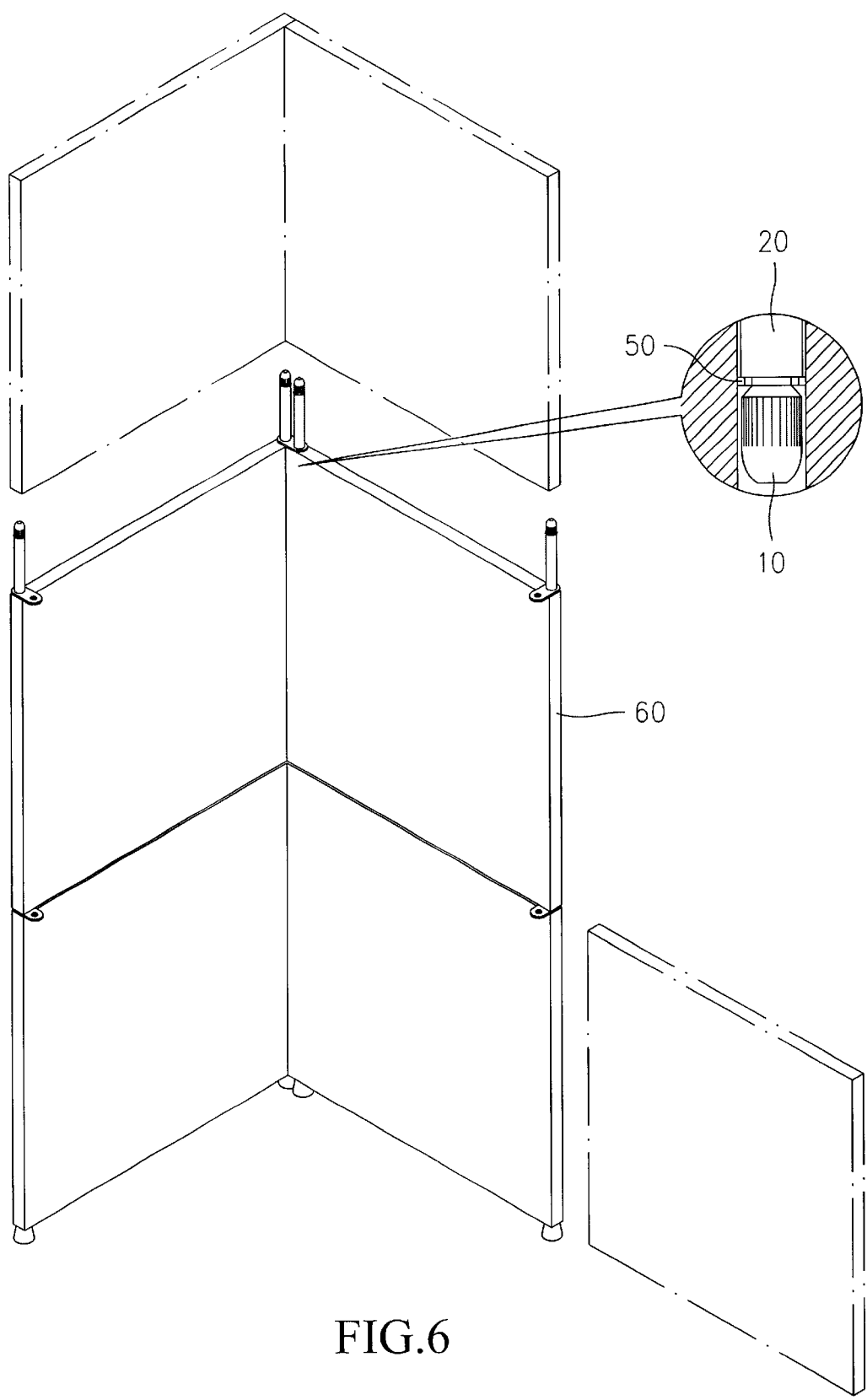
FIGS. 6, 7, 8 and 9 are assembled section schematic views of the partition screen connecting device and partition screens.

With reference to FIGS. 1 and 5, the present invention includes an insert head 10, a coupling tube 20, a connecting plate 30 having round holes 31, a coupling threaded rod 40, and a tightening element 50. The insert head 10 is threadedly fitted into one end of the coupling tube 20. The other end of the coupling tube 20 receives threadedly one end of the coupling threaded rod 40 that passes through the connecting plate 30. The other end of the coupling threaded rod 40 is connected threadedly to another coupling tube 20, which is connected to another insert head 10 in a symmetrical assembling relationship. The tightening element 50 is a soft or flexible element that is disposed between the insert head 10 and the coupling tube 20 when they are coupled. The tightening element 50 has a plurality of symmetrical projections 51 extending outwardly from an outer periphery thereof It can be seen from the drawings that the two coupling tubes 20 sandwich the connecting plate 30 firmly therebetween and, in FIG. 1, they are shown to be adapted for intermediate connection. In use, the coupling tube 20 along with the insert head 10 may fit into a support tube 61 provided on a side edge of a partition screen 60 (see FIG. 6). If the other round hole 31 of the connecting plate 30 is connected to another coupling tube 20 and insert head 10, partition screens 60 can be interconnected to permit folding and extension thereof It should be noted that by virtue of the protrusions 51, the tightening element 50 provided at the lower portion of the connecting device is slightly larger than the respective outer diameter of the coupling tube 20 and the insert head 10 so that, after being inserted into the support tube 61 of the partition screen 60, it can achieve a firm positioning effect to prevent improper slippage of the connecting device.

Figure 2:
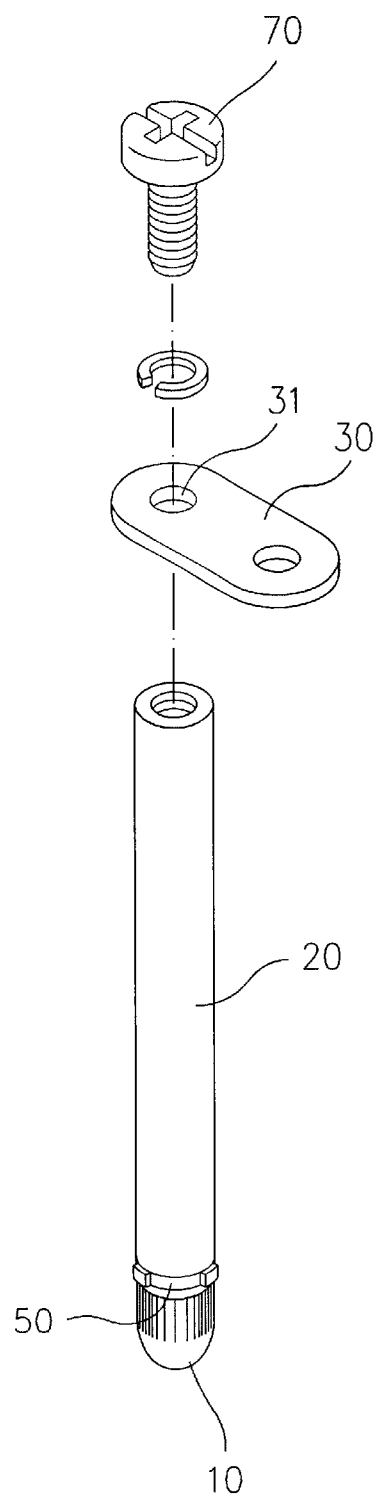
FIG. 2 is a schematic view of the partition screen connecting device (for top connection) of the present invention.
Figure 7:
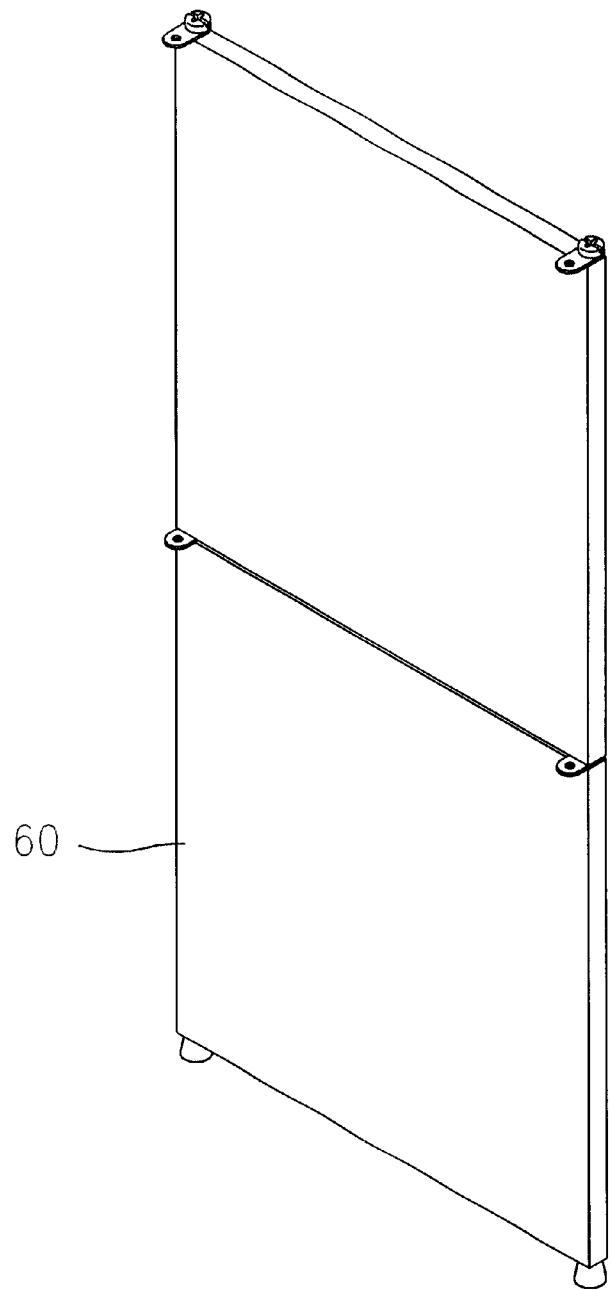

With reference to FIGS. 2 and 7, the connecting device of the present invention, unless it is intended to have another partition screen disposed on top of the partition screen 60, a threaded element 70 is used to close the top end of the coupling tube 20 below the connecting plate 30 directly without providing addition coupling tube and insert head, so that the partition screen is more pleasing in appearance after assembly.

Figure 3:
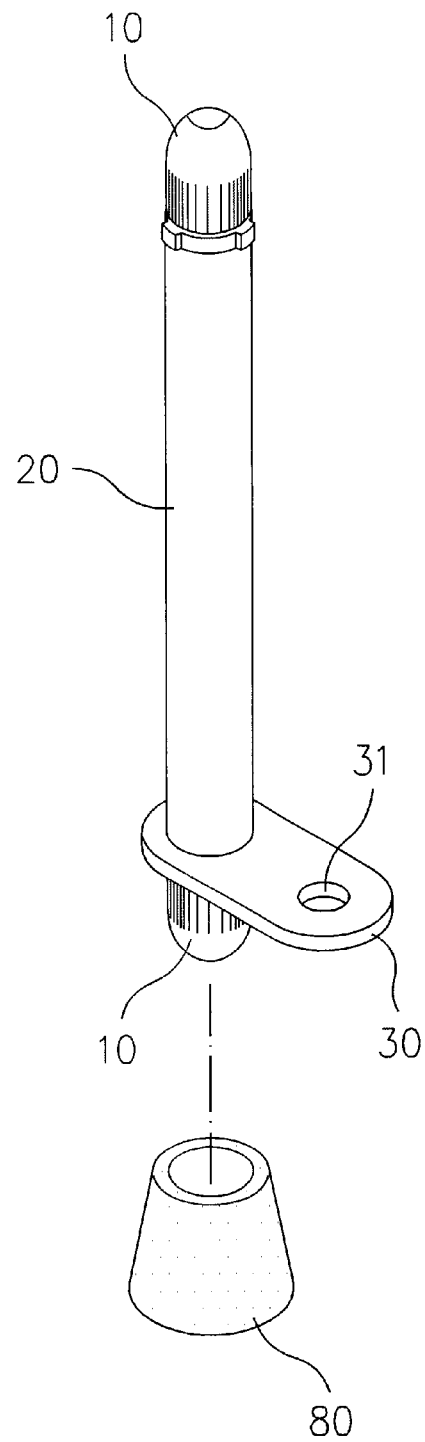
FIG. 3 is a schematic view of the partition screen connecting device (for bottom connection) of the present invention.
Figure 8:
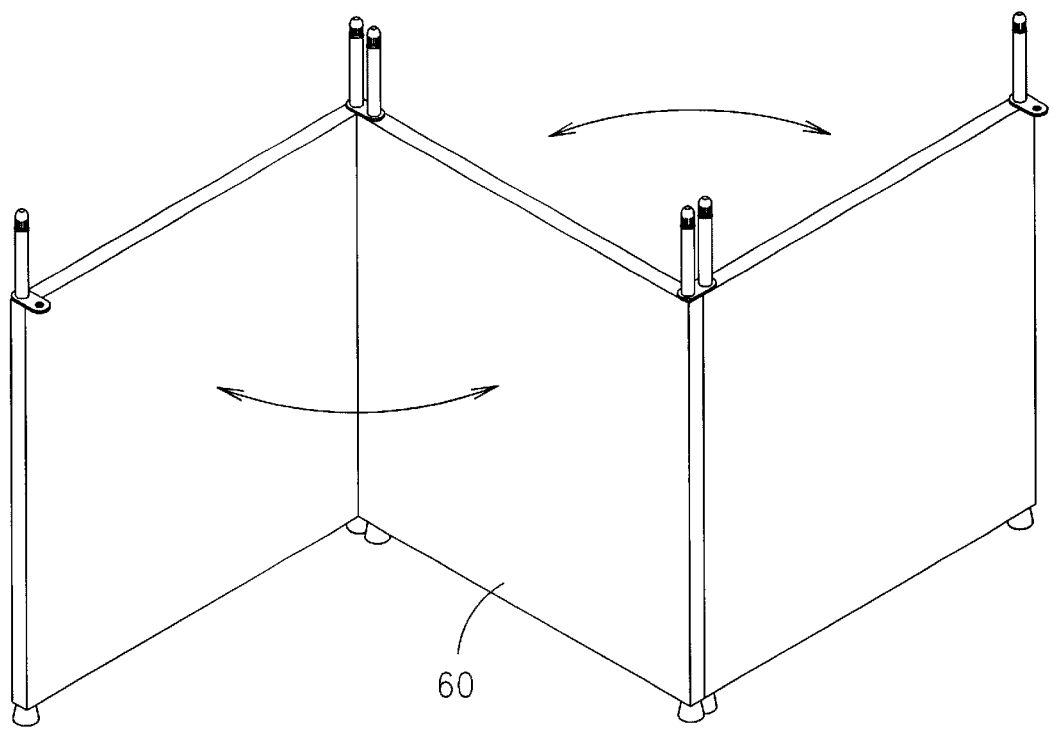

With reference to FIGS. 3 and 8, when using the connecting device of the present invention to connect the bottom end of the partition screen 60, instead of providing a coupling tube 20 below the connecting plate 30, an insert head 10 is directly coupled to the coupling tube 20 above the connecting plate 30 with the other end fitted into a leg pad 80 for supporting the partition screen 60 firmly on the floor.

Figure 4:
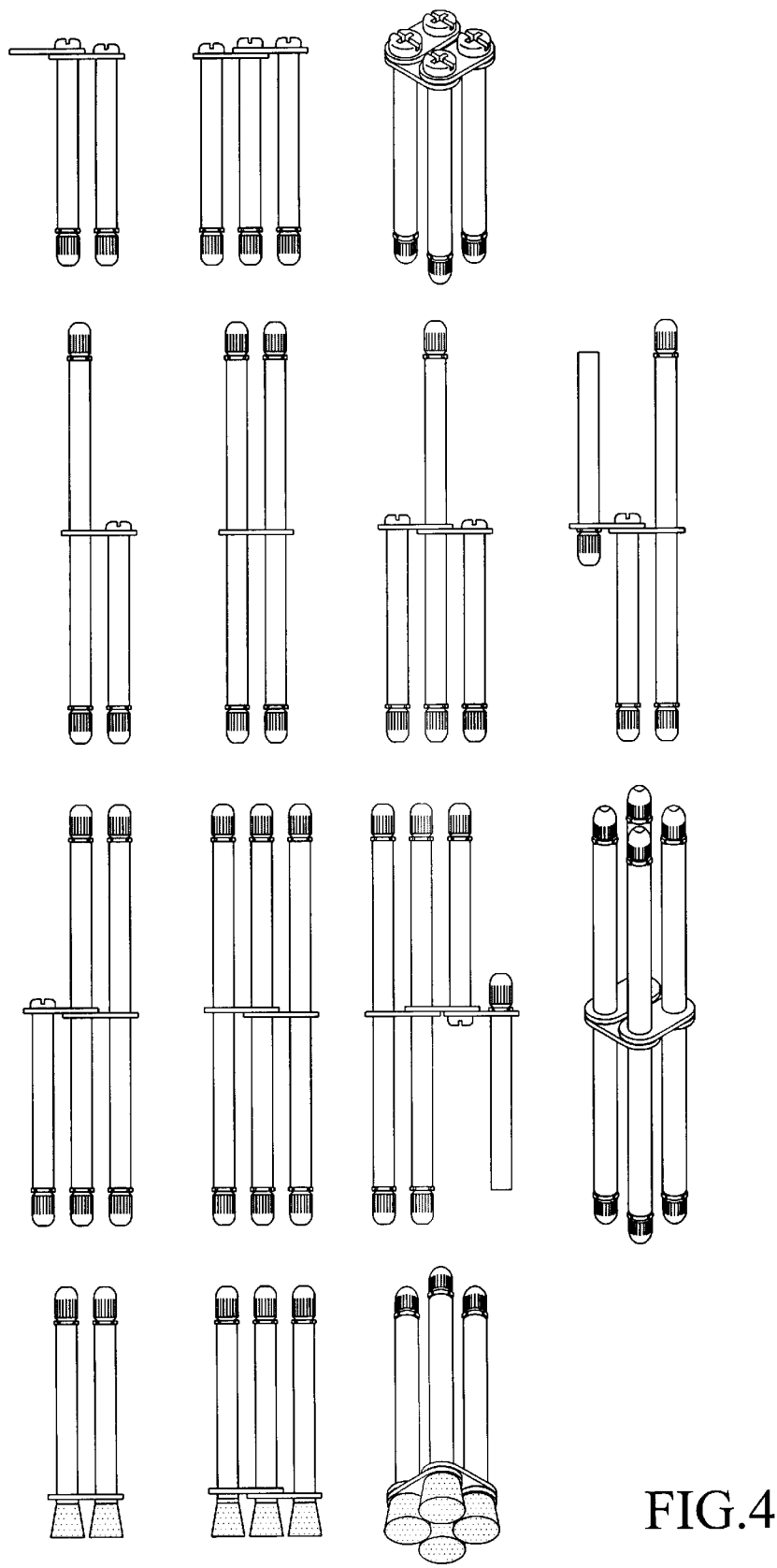
FIG. 4 is a schematic view illustrating different manners of interconnection of partition screen connecting devices of the present invention.
Figure 9:
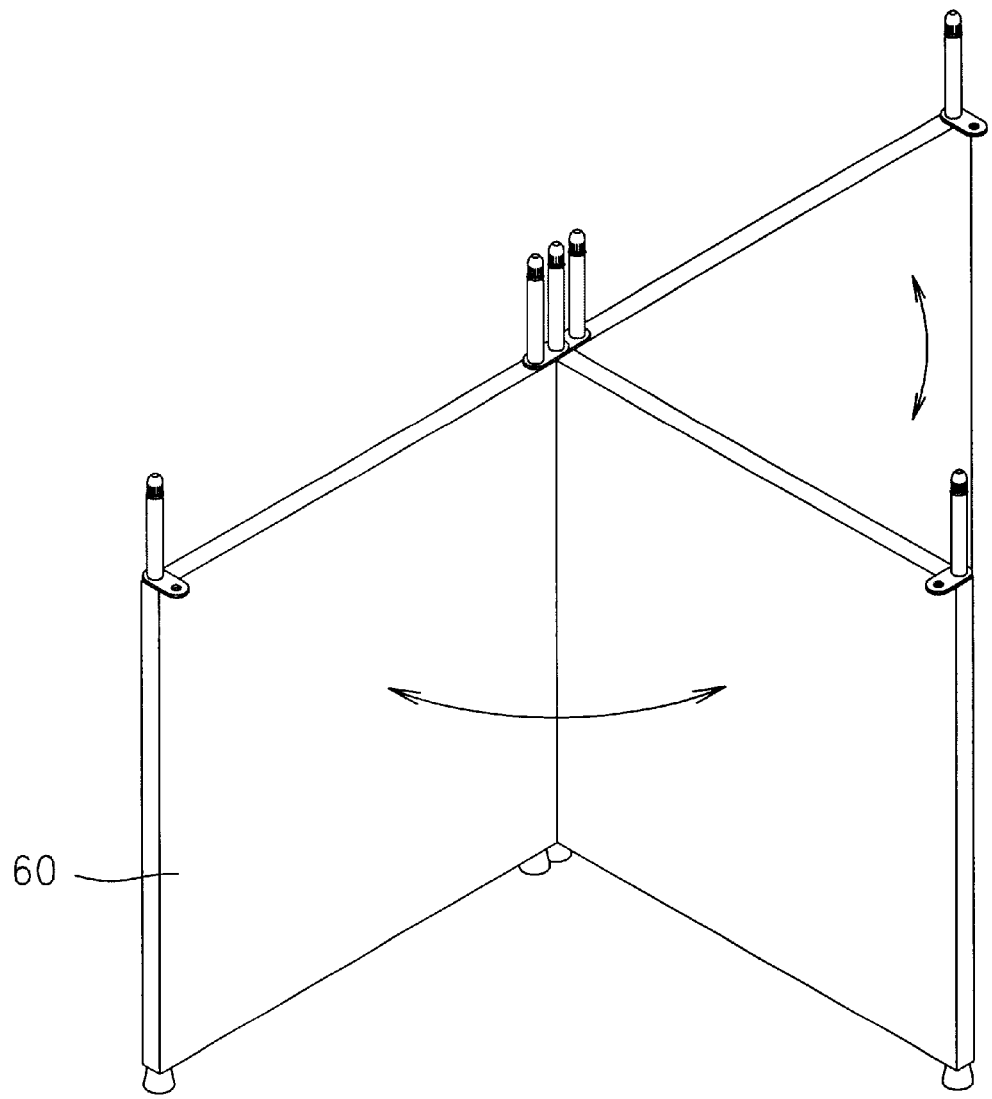

With reference to FIGS. 4 and 9, the connecting device of the present invention can be used to connect partition screens in units of one, two, three or four to give variety to the assembly of parition screens.

In view of the foregoing, the partition screens of the present invention, in addition to serving as partitions, are foldable, stackable, and interconnectable.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A partition screen connecting device, comprising an insert head, a coupling tube, a connecting plate, and a coupling threaded rod, the insert head being threadedly inserted into one end of the coupling tube, the other end of the coupling tube being threadedly coupled with one end of the coupling threaded rod that passes through the connecting plate, the other end of the coupling threaded rod being connected to another coupling tube and insert head in a symmetrical connecting relationship, the two coupling tubes sandwiching the connecting element therebetween, wherein a tightening element is clamped between the coupling tube and insert head at a lower portion of the connecting device, the tightening element having a plurality, of protrusions extending from an outer periphery thereof, the coupling tube and insert head at a lower portion of the connecting device are directly fitted provided with a leg pad, the connecting plate has round holes, and there are more than one connecting plate.

\* \* \* \* \*